US011703878B2

(12) United States Patent
Verbrugh et al.

(10) Patent No.: US 11,703,878 B2
(45) Date of Patent: Jul. 18, 2023

(54) INDOOR POSITIONING SYSTEM FOR MOBILE OBJECTS (71) Applicant: SIGNIFY HOLDING B.V., Eindhoven (NL)

(72) Inventors: Stefan Marcus Verbrugh, Eindhoven (NL); Robert James Davies, Eindhoven (NL); Paul Henricus Johannes Maria Van Voorthuisen, Sint Oedenrode (NL); Alexander Paulus Philippus Maria Habets, Westerhoven (NL); Johan Wilhelmus Hermanus Kuppen, S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 105 days.

(21) Appl. No.: 16/645,593

(22) PCT Filed: Aug. 29, 2018

(86) PCT No.: PCT/EP2018/073177
§ 371 (c)(1),
(2) Date: Mar. 9, 2020

(87) PCT Pub. No.: WO2019/048296
PCT Pub. Date: Mar. 14, 2019

(65) Prior Publication Data
US 2021/0365035 A1  Nov. 25, 2021

(30) Foreign Application Priority Data
Sep. 7, 2017 (EP) ..................... 17189882

(51) Int. Cl.
G05D 1/02 (2020.01)

(52) U.S. Cl.
CPC ......... *G05D 1/0234* (2013.01); *G05D 1/0246* (2013.01); *G05D 1/0274* (2013.01); *G05D 1/0289* (2013.01); *G05D 2201/0216* (2013.01)

(58) Field of Classification Search
CPC .. G05D 1/0234; G05D 1/0274; G05D 1/0289; G05D 1/0246; G05D 2201/0216
See application file for complete search history.

(56) References Cited

U.S. PATENT DOCUMENTS 8,594,510 B2    11/2013  Schenk et al.
11,055,785 B1*  7/2021   Lundsgaard ........... G06Q 40/08
(Continued)

FOREIGN PATENT DOCUMENTS

CN    101419069 A    4/2009
CN    103869284 A    6/2014
(Continued)

Primary Examiner — Hunter B Lonsberry
Assistant Examiner — Harrison Heflin (57) ABSTRACT A mobile object configured for movement in an area equipped with VLC illumination sources comprises a light sensor arranged to detect illumination from at least one of the illumination sources within the view of the light sensor; a computer arranged to determine from the detected illumination (i) a position of the mobile object relative to the at least one illumination source and (ii) the identifier of the at least one illumination source; and a transceiver. The transceiver can receive from another mobile object a message comprising the position of the other mobile object relative to a source of illumination, and the identifier of that source of illumination. From this, the computer determines from its position and the message a distance from the other mobile object. A mobile object which transmits such a message is also envisaged.

18 Claims, 3 Drawing Sheets (56) References Cited

U.S. PATENT DOCUMENTS

| | | | |
|---|---|---|---|
| 2010/0109864 A1 | 5/2010 | Haartsen et al. | |
| 2014/0093249 A1* | 4/2014 | Roberts | G01C 11/00 398/127 |
| 2015/0377609 A1* | 12/2015 | Shen | G01B 11/14 356/4.07 |
| 2016/0047888 A1 | 2/2016 | Roberts | |
| 2016/0047890 A1* | 2/2016 | Ryan | H04W 4/026 398/118 |
| 2016/0149640 A1 | 5/2016 | Jovicic | |
| 2016/0259329 A1* | 9/2016 | High | G05D 1/0061 |
| 2016/0260145 A1* | 9/2016 | High | G05D 1/0022 |
| 2017/0261975 A1* | 9/2017 | Liu | H04B 10/116 |
| 2017/0344017 A1* | 11/2017 | Liu | G05D 1/028 |
| 2018/0012370 A1* | 1/2018 | Aghamohammadi | G06T 7/50 |
| 2018/0126976 A1* | 5/2018 | Naserian | B60K 6/48 |
| 2018/0178376 A1* | 6/2018 | Lalonde | B25J 9/1651 |
| 2018/0350098 A1* | 12/2018 | Siessegger | G06T 7/50 |
| 2019/0028904 A1* | 1/2019 | Carpenter | G08G 5/0069 |
| 2019/0035284 A1* | 1/2019 | Tam | G05D 1/0297 |
| 2020/0117189 A1* | 4/2020 | Kawai | B60W 60/0011 |

FOREIGN PATENT DOCUMENTS

| | | | | |
|---|---|---|---|---|
| CN | 106155057 A | 11/2016 | | |
| CN | 106767825 A | 5/2017 | | |
| EP | 2478745 B1 | 1/2014 | | |
| EP | 2494712 B1 | 1/2017 | | |
| JP | 2010086038 A | 4/2010 | | |
| JP | 2017071395 A | 4/2017 | | |
| WO | 2005038480 A1 | 4/2005 | | |
| WO | 2015036912 A1 | 3/2015 | | |
| WO | WO-2015144553 A1 * | 10/2015 | | G01S 5/16 |
| WO | 2017058107 A1 | 4/2017 | | |

\* cited by examiner

INDOOR POSITIONING SYSTEM FOR MOBILE OBJECTS

CROSS-REFERENCE TO PRIOR APPLICATIONS

This application is the U.S. National Phase application under 35 U.S.C. § 371 of International Application No. PCT/EP2018/073177, filed on Aug. 29, 2018, which claims the benefit of European Patent Application No. 17189882.8, filed on Sep. 7, 2017. These applications are hereby incorporated by reference herein.

TECHNICAL FIELD

The present disclosure relates to an indoor positioning system for mobile objects and mobile objects for use in the system.

BACKGROUND

So called autonomous vehicles are becoming increasingly wide-spread in their use both outdoors and indoors. Autonomous vehicles are vehicles which can be moved around without being required to be driven by a human. They encompass, for example, self-drive cars, robots, drones etc. They have a source of power, for example an engine, which means they are not portable objects—their mobility comes from their own source of power. The direction and speed of the autonomous vehicle is controlled by an on-board computer which executes computer software to control the vehicle. There are many challenges in such a context. A significant challenge is to prevent autonomous vehicles from colliding with one another or with other obstacles in an environment. A variety of different solutions have been proposed to address this problem. The challenges are different in an external environment (outdoors) as compared with an indoors environment. One proposal which has been made provides a vehicle interval measurement method which is based on visible light communication between vehicles. Optical transmitters and receivers are provided on the vehicles so that the vehicles can determine the inter vehicle distances by being in communication with one another through these optical signals.

SUMMARY

According to an aspect of the present invention there is provided a mobile object configured for movement in an area equipped with illumination sources each configured to emit illumination from which a unique identifier of the illumination source can be determined, the mobile object comprising: a light sensor arranged to detect illumination from at least one of the illumination sources within the view of the light sensor; a computer arranged to determine from the detected illumination (i) a position of the mobile object relative to the at least one illumination source and (ii) the identifier of the at least one illumination source; a transceiver coupled to the computer and configured to receive from at least one other mobile object in the area a message comprising the position of the at least one other mobile object relative to a source of illumination, and the identifier of that source of illumination, the computer configured to determine from its position and the message received from the at least one other mobile object a distance from the at least one other mobile object. Consequently, accessing a database comprising the location of said illumination sources is not required.

The transceiver can be configured to transmit a message comprising the position of the mobile object relative to the at least one illumination source determined by the computer and the identifier of the at least one illumination source. For more accurate positioning, at least two illumination sources can be utilised, and the light sensor constitutes a camera with the at least two illumination sources in view.

The transmitted or received message can comprise a footprint of the mobile object. Said footprint may be a surface area, a volume, or a contour of the mobile object. In one embodiment, the transmitted or received message comprises the speed of the mobile object.

The light sensor can be arranged to detect illumination from at least two of the illumination sources in the area, and the computer may be arranged to determine from the detected illumination an orientation of the mobile object relative to the at least two illumination sources. As mentioned above, this permits more accurate positioning.

The computer may be arranged to determine a distance of the mobile object with respect to the at least one illumination source.

The computer may be configured to determine an intended path of the mobile object and to transmit the intended path to a path management entity.

The mobile object may comprise an image recognition module configured to access image data captured by the light sensor for use in more accurately determining the position of the mobile object. Alternatively, said object may comprise an image recognition module configured to access image data captured by an additional camera for use in more accurately determining the position of the mobile object. For example, the image recognition module may recognize borders, corners, and/or guides, such that the position of the mobile object may be more accurately determined in respect to such recognized features.

The mobile object may comprise a memory for recording movement of the mobile object in the area.

Another aspect of the invention provides a mobile object configured for movement in an area equipped with illumination sources each configured to emit illumination from which a unique identifier of the illumination source can be determined; the mobile object comprising: a light sensor arranged to detect illumination from at least one of the illumination sources within the view of the light sensor; a computer arranged to determine from the detected illumination (i) a position of the mobile object relative to the at least one illumination source and (ii) the identifier of the at least one illumination source; and a transceiver coupled to the computer and configured to transmit a message to at least one other mobile object in the area, the message comprising (i) the position of the mobile object relative to the at least one illumination source determined by the computer and (ii) the identifier of the at least one illumination source, whereby the at least one other mobile object can determine a distance between the mobile object and itself based on its own position relative to the at least one illumination source, and the position in the message.

Another aspect of the invention provides a positioning system comprising illumination sources each configured to emit illumination from which a unique identifier of the illumination source can be determined; at least one mobile object according to the first definition; and at least one mobile object according to the second definition. Said positioning system may either be an outdoor positioning system or an indoor positioning system. In an outdoor positioning system, the area may be relatively large and comprise many luminaires arranged in an elaborate layout, hence the present invention being advantageous as no luminaire database (or map) is required to be accessed by objects navigating by means of said positioning system. Similarly, the positioning system being an indoor positioning system is also advantageous, as confined spaces indoor are prone to collisions, which are prevented by the present invention. The positioning system may for example be arranged in a building wherein the building is configured to emit illumination comprising coded information about the building to the mobile objects. Alternatively, other means for emitting information may be envisioned such as RF, IR, Wi-Fi, Bluetooth, ZigBee, etc. The building may be equipped with at least one light sensor, and the mobile object can comprise at least one source of illumination configured to emit illumination from which a unique identifier of the source of illumination can be identified. The indoor positioning system can comprise a storage medium in which the relative position of the illumination sources in the area is held.

Said positioning system may be arranged indoor as part of a building lighting infrastructure. Said positioning system may be arranged outdoor as part of a lighting infrastructure.

A further aspect of the invention provides a method implemented at a mobile object of determining distance between the mobile object and at least one other mobile object moving in an area equipped with illumination sources each configured to emit illumination from which a unique identifier of the illumination source can be determined, the method comprising: detecting illumination from at least one of the illumination sources; determining from the detected illumination (i) a position of the mobile relative to the at least one source of illumination and (ii) the identifier of the at least one light source; receiving from the at least one other mobile object a message comprising the position of the at least one other mobile object relative to that source of illumination; and determining from the position of the mobile object and the at least one other mobile object a distance between them.

A further aspect of the invention provides a computer program product downloadable from a communications network and/or stored on a computer readable medium and/or microprocessor-executable medium wherein the computer program product comprises computer program code instructions, which when executed by at least one processor, implement a method as in the present invention.

BRIEF DESCRIPTION OF THE DRAWINGS

To assist understanding of the present disclosure and to show how embodiments may be put into effect, reference is made by way of example to the accompanying drawings.

DESCRIPTION OF EMBODIMENTS

An indoor positioning system for mobile objects, such as autonomous vehicles, is described herein. In this context autonomous vehicles are vehicles which do not require a human to control their path but instead control their own position and speed through on-board computers programmed by computer software. Autonomous vehicles have their own source of power, for example an engine. They include but are not limited to robots, self-drive cars and drones. There are several contexts where such vehicles are used in an indoors environment, for example in a factory or a warehouse, or passenger cars in a tunnel. In such environments, positioning systems which can operate outdoors for such vehicles (for example GPS-based systems) may no longer be effective. The present inventors have based the present indoor positioning system on an environment which utilises illumination sources which can emit visible light on which a unique ID has been modulated. An indoor positioning system using visible light communication (VLC) is currently available for positioning portable devices such as smart phones and other devices which have a camera. Illumination sources such as luminaires in a ceiling of the indoor environment emit a unique identifier using coded light, and this is captured by the camera of the portable device. The location of each luminaire is held in a database together with the unique identifier, and the portable device (such as the smart phone) may access its database through an Internet connection to determine its location based on the identifier of the luminaire that has been captured by the camera. The inventors have recognised that an indoor positioning system for mobile objects such as autonomous vehicles may utilise coded light, but that the indoor positioning system which is currently available for smart phones etc. is not suitable in the context of autonomous vehicles. They have developed the indoor positioning system described herein to overcome such disadvantages, in a manner described in more detail later.

Figure 1:
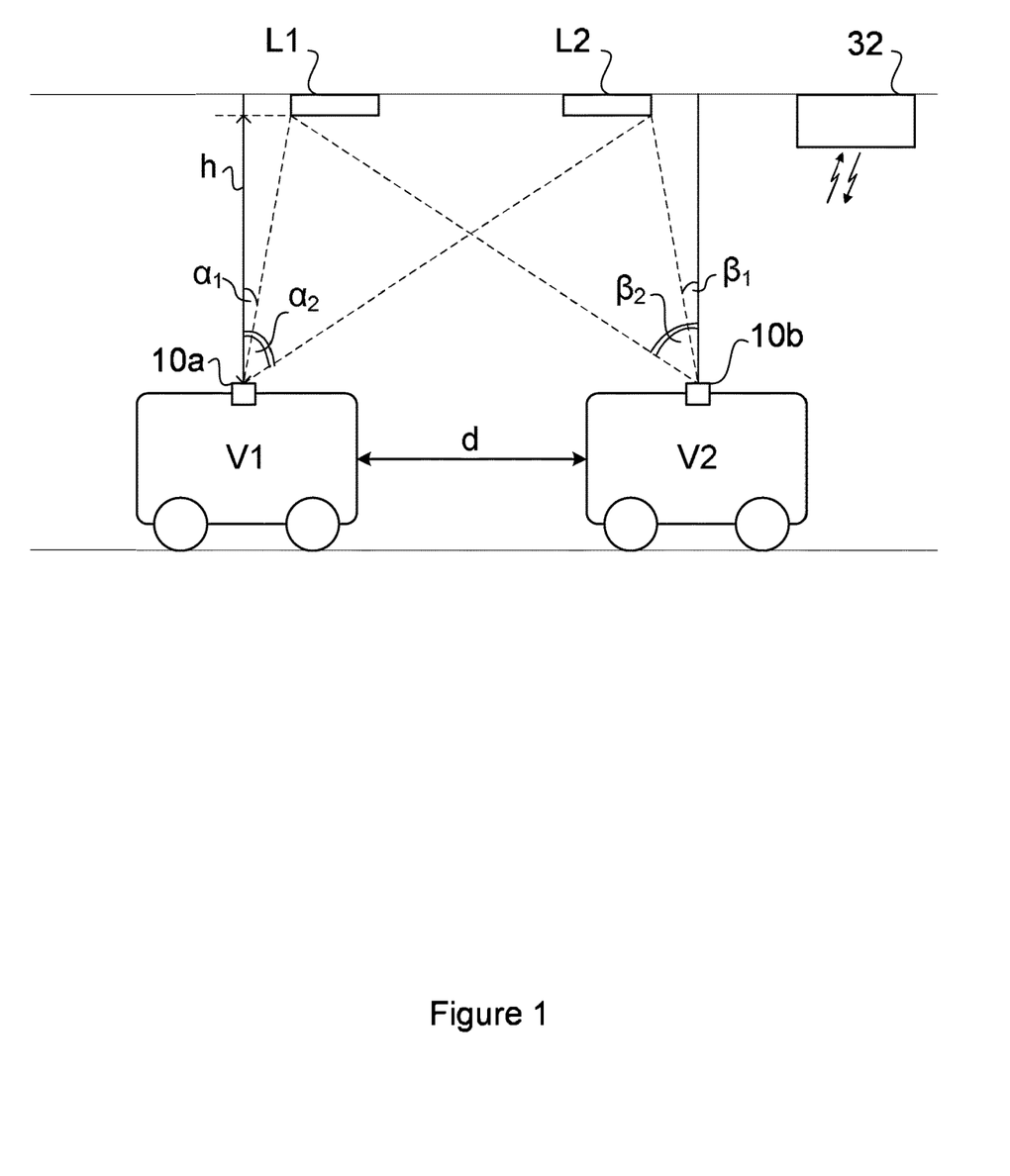
FIG. 1 shows two autonomous vehicles in an indoor positioning system.

Firstly, the indoor positioning system according to embodiments will be described. Reference is made to FIG. 1.

FIG. 1 shows two mobile objects, such as autonomous vehicles, V1, V2.

Each vehicle is similarly equipped with reference numerals having a suffix 'a' denoting items on the vehicle V1, and reference numerals having a suffix 'b' denoting items on the vehicle V2. The vehicles are in an indoor environment in which a number of illumination source (often referred to herein as luminaires), are mounted, including sources on the ceiling denoted in FIG. 1 as L1 and L2. It will be appreciated that many such illumination sources may be provided around the indoor environment. The illumination sources are VLC sources which are capable of transmitting visible illumination on which a unique identifier has been encoded by modulation. Each vehicle is equipped with a wireless transceiver which acts as a transmitter and/or receiver to allow the vehicles in the venue to communicate with each other via a short-range wireless connection, for example RF (Radio Frequency). A particular channel may be chosen for all vehicles, or for sets of vehicles. The dotted lines in FIG. 1 show how the camera 10a on the vehicle V1 captures light from a first luminaire L1 at a first angle $\alpha_1$ and from a second luminaire L2 at a second angle $\alpha_2$. Similarly, the camera 10b on vehicle V2 captures light from the first luminaire L1 at a certain angle $\beta_1$ and light from the second luminaire L2 at a certain angle $\beta_2$. Each vehicle sends information to the other vehicles about its position relative to the luminaires in view. The vehicles each have a computer that can derive the mutual distance from the information about luminaires that are in view of the vehicle and the other vehicles in its vicinity. For more accurate positioning, the camera of each vehicle may have at least two luminaires in view. The mutual distance between vehicle V1 and V2 in FIG. 1 is labelled d. In order to determine the mutual distance, the vertical distance h between the camera and the light luminaires needs to be known (basically the height of the luminaire). In a basic implementation of the system the height of the light may be communicated to the vehicles as a fixed parameter from a central control component of the system. In an alternative implementation, the system may determine the height autonomously (for example in the case of drones which are flying through the environment and which are not travelling on the ground). Possible techniques for determining the height autonomously are discussed later. In an enhancement of the system, also discussed later, time-based information about the intended path of the vehicle may be provided to other vehicles so that they can adapt their path if necessary to avoid collisions.

Figure 2:
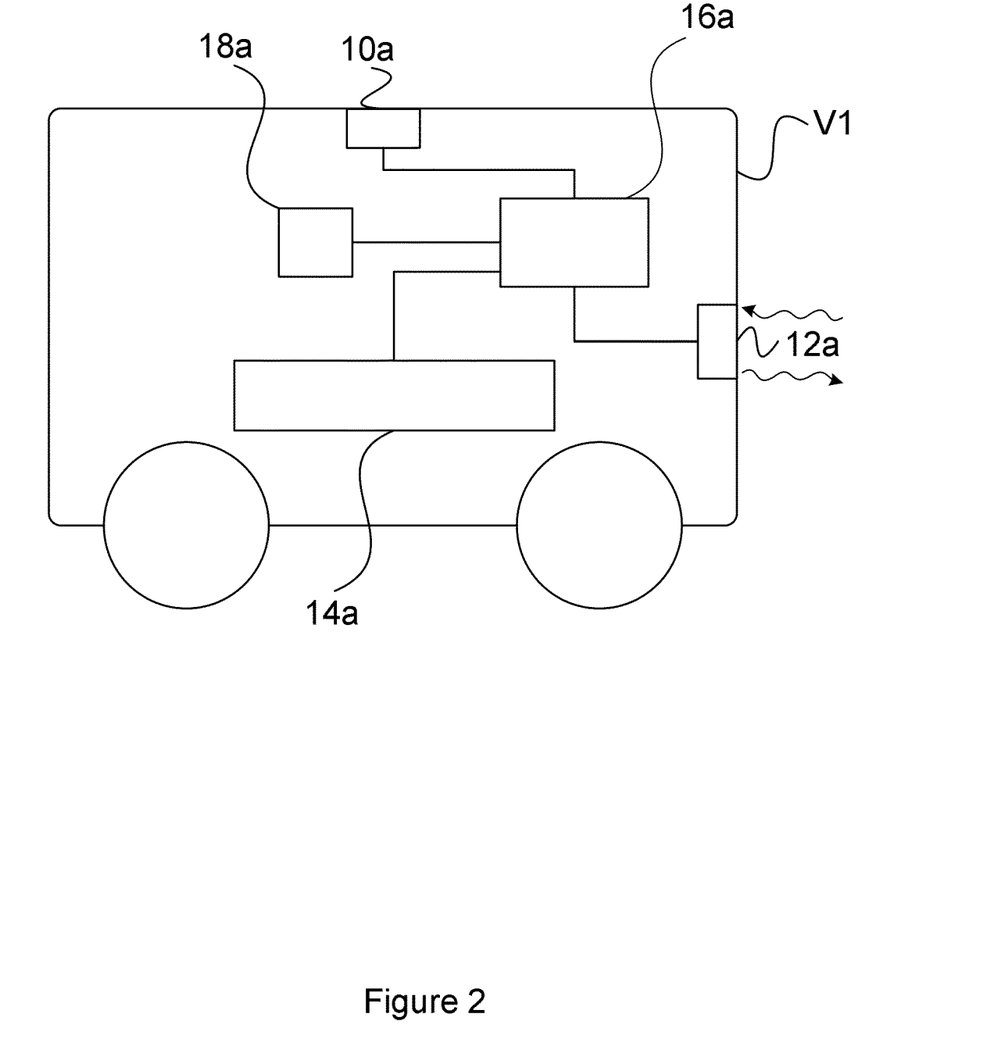
FIG. 2 shows schematically components of a vehicle.

FIG. 2 is a schematic block diagram showing components of an autonomous vehicle. An indoor positioning system can comprise a number of such vehicles. As already mentioned, the vehicle comprises a camera 10a which is located on the roof of the vehicle so as to be able to detect light from luminaires mounted on the ceiling of the indoor area. The vehicle carries a transceiver which capable of exchanging data with other vehicles and which comprises a transmitter and a receiver. In general all vehicles will have a transceiver which is capable both of transmitting and receiving. It is possible, however, in some circumstances that some vehicles may be capable only of receiving, while other vehicles may be capable only of transmitting. The environment may have a central controller 32 similarly capable of performing one or both of these actions to communicate with the vehicles. The vehicle V1 is equipped with a drive mechanism 14a by means of which the vehicle is powered and the wheels steered etc. There is no need to go into the details of the drive mechanism here, because they are well known in the art. The drive mechanism is controlled by a processor 16a which implements the controller of the vehicle (in the form of an on-board computer or the like). Amongst other functions, the controller 16a receives information from the camera 10a, processes the information and provides data corresponding to that information to the transceiver 12a to be transmitted from the vehicle in a message sent over a wireless channel. The controller 16a also performs the function of receiving data which is received by the transceiver 12a in messages from other vehicles and processing that data to provide positioning information which can be used to control the drive mechanism 14a. The vehicles are also each equipped with a memory 18a which amongst other things, can record a history of movement of the vehicle in the area.

Figure 3:
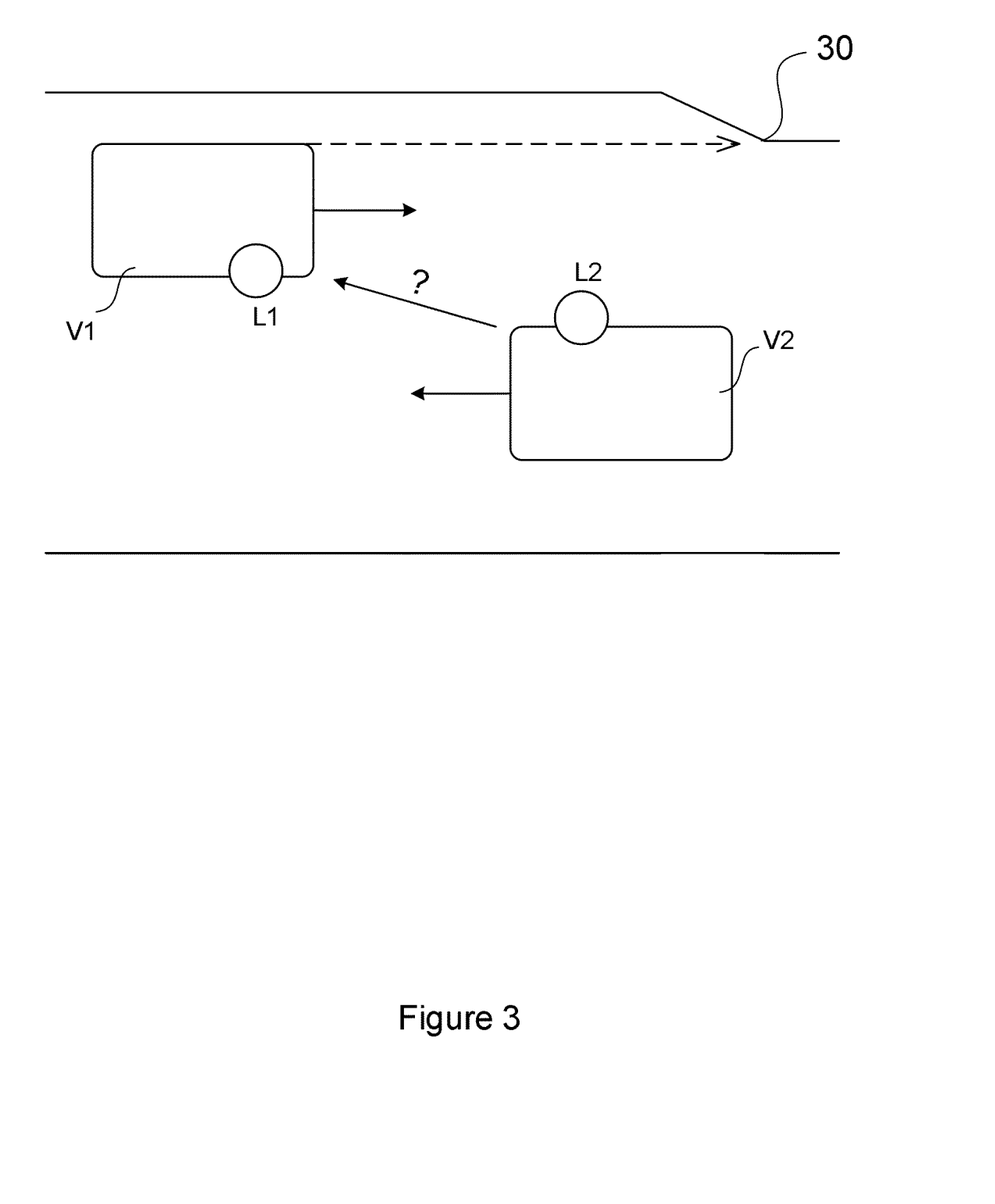
FIG. 3 shows a plan view of the arrangement of FIG. 1.

FIG. 3 shows a plan view of the vehicles of FIG. 1 which are attempting to pass each other side by side. Information from the vehicle V1 about the luminaires L1, L2 and the angle with which it perceives them is conveyed to the vehicle V2 in a message to enable the vehicle V2 to assess its relative position with respect to the vehicle V1. Thus, two vehicles can pass each other on a path, such as a road or in an aisle (for example in a factory or a warehouse).

The data which is exchanged between the transceivers of the vehicles can be in a number of different formats. According to one implementation, the message contains a footprint of the vehicle with reference to the lights in view, where the lights are indicated by reference to the VLC identifier. Each vehicle has a memory 18a which holds a footprint of that vehicle, for access by the controller 16a. The controller 16a 'knows' where the camera 10a is located with respect to the overall footprint of the vehicle and can therefore supply the positional reference of the vehicle footprint with respect to light sources within view of the camera. The location of the camera with respect to the footprint may also be held in the memory 18a. The data which is exchanged between vehicles can include all of the luminaires in view, and the position of the vehicle relative to each luminaires. It is also possible for the data to include the speed of the vehicle as well as the positional information. Orientation, which is obtained by the indoor positioning system if at least two luminaires are in view, may also be included. In scenarios where orientation is crucial, the density of luminaires should be such that there are always at least two luminaires in view. For drones (and other flying mobile objects), the distance of the flying object from the luminaires is also transmitted (the flying height). The height can be determined autonomously for example with the following methods. In one method, one luminaire with a certain VLC code is seen by the two cameras spaced by a known distance on the same vehicle under a different angle, enabling height to be calculated. In another method, the height of a light can be derived from the forward speed of the vehicle. In another method, a separate distance measurement facility can be installed.

Optionally, the building itself may participate in the positioning system and send information about the luminaires in its vicinity and its boundaries. This could be done by way of information held at the central controller and available to the vehicles, or could be downloaded into each vehicle as it arrives in the area. Reference numeral 30 in FIG. 3 denotes a possible obstacle in the wall of the building that could be notified by its relative position to luminaires in the building. The problem which is addressed by this is to indicate reliably where the vehicle V1 can proceed moving to the right as shown by the dotted arrow without hitting the wall, and while leaving maximum room for other vehicles. In other words, if vehicle V1 can accurately determine its distance with respect to the wall, it does not need to take too large a margin to ensure that it avoids it.

If a vehicle has at least two luminaires in view, in can further determine its orientation with respect to the luminaires, and can additionally supply that information to other vehicles in the system.

Coded Light (CL) is a method to embed information in the emitted light of electrical light sources without affecting the primary illumination function. Hence, the embedded information is not perceptible by humans but is electronically detectable. In general, the embedded information is encoded in the form of high frequency intensity and/or chromaticity modulations.

Preferably the code in the coded light signal is invisible to a human and is perceived as continuous flicker-free illumination light, or the code in the coded light signal may simply be unobtrusive to a human. In order to be perceived as flicker free the spectrum of the modulated signal, or the emitted light should not contain low frequencies, preferably there should be limited or no frequency components present below 50 Hz, and more preferably limited or no frequency components below 100 Hz. Moreover, it is noted that repetitive messages may also give rise to low frequency components, however, this may be addressed through proper channel coding. For example in case of amplitude modulation, one could use a DC-free channel code, such as Manchester coding.

In embodiments, the modulation may comprise a single tone (sinusoid) or a single oscillating waveform (e.g. rectangular wave) and the frequency of this tone or waveform acts as the embedded code (i.e. different light sources each emit light with a different unique modulation frequency, unique within the system in question).

As light sources connected to the usual power grid commonly produce strong interference e.g. at DC, 50 Hz or 100 Hz, these frequencies quite often need to be suppressed at the coded light receiver side; i.e. filtered out in order to increase the signal to noise ratio. It is advantageous to take such filtering into account when selecting the modulation (parameters), for example in case of frequency shift keying (FSK), the modulation frequencies are preferably placed at a sufficient distance from these suppression bands.

Alternatively more complex modulation schemes are possible in order to embed more complex data. For example the modulation frequency may be varied to represent data according to a frequency keying scheme, or the phase of the modulation frequency may be varied to represent data according to a phase keying scheme, or the amplitude of the modulation may be varied to represent data according to an amplitude keying scheme (e.g. a Manchester code or ternary Manchester code).

Alternatively coded light may leverage the fact that the human eye sensitivity to changes in color is lower than the sensitivity to changes in intensity. This may be advantageously used to modulate information in the light output of a luminaire with at least two light sources having different spectral color output. An example of such a system can be found in U.S. Pat. No. 8,594,510, but other approaches are known to those skilled in the art; including e.g. color-shift keying as proposed in IEEE 802.15.7-2011.

To detect coded light, in embodiments the camera 10*a* is a rolling-shutter camera in which the pixels of the image sensor are grouped into a plurality of lines (e.g. horizontal rows), and the camera captures an image by exposing each of the lines in a sequence, at slightly different successive times. Thus each line captures the light from the light source at a slightly different time, and hence a different phase of the modulation. If the line rate is high enough relative to the modulation frequency, this therefore enables the modulation to be detected in the image. If the code is short enough relative to the number of lines in a frame, then the code can be detected in a single frame; or otherwise the code can be detected over multiple frames of a video image. Also, if the camera 10*a* is not a rolling shutter camera but rather a global shutter camera which exposes the whole frame at once, then the coded light can still be detected from a video image if the frame rate is high enough relative to the modulation frequency. Suitable coded light techniques will in themselves be familiar to a person skilled in the art.

By enabling vehicles to communicate their relative position with respect to uniquely identified illumination, an indoor vehicle positioning system is provided which overcomes the disadvantages of a VLC based indoor positioning system as applied to smart phones etc. According to these systems, accuracy may be achieved in practical situations of about 30 cm limited, by practical circumstance such as the accuracy at which the position of luminaires is put into a database. According to the system as described herein, no such database is required, and therefore disadvantages associated with that have been dispensed with. For example, it takes time to access a luminaire database via an Internet connection, and this would have required causing moving vehicles to slow down or even stop until they could determine their positions. Internet connections are not completely reliable so safety could not be guaranteed when relying on an Internet connection to provide information about vehicle positions. If a database were to be used, all vehicles in the system would need access to the right luminaire database. This problem could potentially be solved in applications where all vehicles and the venue are managed by the same party (for example, a warehouse), but would remain a problem in contexts where that is not the case, for example self-driving cars in indoor environments such as tunnels or parking garages where GPS cannot be used. Further, it is difficult to guarantee access to a database for cars which are driving other than in their native country because they may not be equipped with the necessary access information. By contrast, the indoor positioning system described herein provides much improved accuracy (possibly to within a centimetre), so enables better optimisation of space utilisation. The system allows orientation information to be provided in addition to position information in some embodiments. The vehicle positioning system works indoors thereby avoiding the need for GPS.

Although the system described herein uses coded light identifiers, it does not require access to a luminaire database Therefore it does not rely on an Internet connection and so there is no risk for position information not being available because such a connection is interrupted. Moreover, there may be a fast response time in vehicles determining their position because network delay is avoided. This may be especially advantageous for vehicles entering an unknown territory, such as a car in a parking area or a drone which is configured to flying in several venues, where the venues do not share a common organisation.

In principle, fewer unique codes are needed to identify the illumination sources (than in a phone positioning system) because the codes need to be unique only within the range of the wireless connection of the vehicles. This means that the code can be shorter and hence can be detected more quickly (which is important if the vehicles are driving at a high speed).

The system also enables a higher accuracy of position to be achieved, because the deviation of the position of the luminaires, as recorded in the database with respect to their real position, is eliminated. This also lowers the risk of errors, as the absolute position of the luminaires is not important. Errors in luminaire location from the database are eliminated entirely. All that is needed is that vehicles can communicate between themselves their own relative position with respect to luminaires that are in their view. Other vehicles which can 'see' the same luminaires can thereby determine what that vehicle is doing relative to these same luminaires and therefore to itself.

Optionally, in order to improve the accuracy of the system, information about the geometry of the luminaires may be exchanged between the vehicles, and between the venue and the vehicles. Such information could be held at a central controller of the system, which could be located in the building. Note that this is not in principle a necessary feature, but would augment the information used by the controllers 16 in the vehicles to check the information that they have received.

A further improvement in accuracy may be achieved by deploying more than one camera on each vehicle.

In general, when driving around an area, each vehicle will have more than one luminaire in view. In a preferred embodiment, the relative positions of these luminaires (and the distance) is communicated to other vehicles in their vicinity.

From the perspective of determining the positions of vehicles with respect to each other, this is redundant information. However, it enables each vehicle to compare the relative position it receives from other vehicles with a relative position it derives itself from its own camera view. Any discrepancies are an indication of an error and can be used to estimate the accuracy of the system under the actual circumstances.

Another piece of information which could be included in a message exchange between vehicles is to use the message to send a signal to other vehicles so that they could break. As the positioning system using coded lights described herein can be very accurate and reliable, information to other vehicles to ask them to break can similarly be accurate and reliable. The indoor positioning system described herein is beneficial in particular when luminaires are already installed for illumination purposes, and can be additionally used for positioning. However, in some cases it may be appropriate to install dedicated lights for VLC positioning.

The system described herein can be used to allocate a certain path through the venue, or the mobile objects can claim a certain 'intended path'. A 'path' means a path defined in space with a certain width (shape) and a defined timing. In addition, the definition of a path may include a tolerance. According to one embodiment, the mobile object claims a path and communicates its claim to other vehicles. Regular updates may be broadcast so that the part of the path that has been covered by the vehicle may be released for use by other vehicles. In another embodiment, the central controller 32 fixed in the venue could provide a path management entity which could communicate through a common wireless channel with the vehicles and allocate the path or approve claims made by the vehicles. In a further embodiment, the controller may keep track of intended paths of several vehicles and optimise all paths and arrange priorities. For example, vehicles could have assigned priority levels, such as the emergency services in a tunnel, or vehicles could 'buy' priority. In one embodiment, the system could retain information about all vehicles in a certain zone or region of the area. Each vehicle could indicate its desired path, or a desired path could be provided to the vehicle so that information about which vehicle intends to go where can be transferred. The system can then optimise the path of all vehicles, but if the area is crowded it could prioritise some vehicles over others. Vehicles could claim priority in a number of different ways. In case of self-driving cars, the user could pay a certain fee so that the vehicle gets priority and the passenger reaches the destination faster. In another example, in a distribution center some orders can have a higher priority, but the related customer has to pay more, (e.g. pay more to an online shop to get a product earlier). The definition of a path can be facilitated by VLC identifiers that are not random but indicate the location of the luminaire in space. For example, in a line of lights in a tunnel a subsequent light (luminaire) has a sequential VLC identifier. According to another example, VLC identifiers of luminaires lights in a warehouse may be configured to form a grid where the VLC identifier may have a format XY.

Under certain conditions the system can guide the vehicles around roadblocks. This can be achieved by the central controller (or by each individual vehicle) if the position of each vehicle is supplied to the central controller (or to all vehicles). In this scenario, if vehicles are stuck on a path, for example because of a technical failure or crash, they can create an unexpected (sudden) obstacle. As the system knows the precise location and orientation of the vehicles which have become stuck, it is able to guide other vehicles around the obstacle. This can be useful in at least two ways. It can enable fast avoidance of collisions (because the coded light system used herein is fast, reliable and precise), and it can optimise the route of vehicles further away to avoid the blocked route through the path management entity.

It may in some circumstances be beneficial to install illumination sources on the vehicles, and light sensors on the ceiling. This can further aid positioning information to enable the precise location and orientation of the vehicles to be determined. For example, the outer corners of a vehicle could be marked with illumination sources, to avoid the need to communicate a footprint.

The system described herein has a wide variety of applications. For example it may be used in the field of self-driving vehicles for logistic services, such as warehouses, greenhouses, auctions halls etc. According to one particular example, goods could be bought to trucks which are in so-called dock-shelters. Due to the possibility offered by the system described herein of extremely accurate alignment of a trolley and the truck, the goods could be bought into the truck with minimal human intervention.

The system could be applied for robots in a factory.

The system could be applied for self-driving cars, or driverless-cars in particular in an indoor environment where no GPS is available such as tunnels or parking garages.

The system could be applied to drones in an indoor environment.

In all of these applications the system described herein can offer a number of benefits. Collision between vehicles may be avoided by means of exchanging information about the location (and possibly their intended path) with respect to each other. Mobile objects may move at higher speeds and carry out manoeuvres at higher speeds because the positioning system described herein may be faster and more accurate than other positioning methods, and because it can be utilised to provide heading information (orientation). The system may in general be safer than other mechanisms due to the lower risk of collision.

Note that the indoor positioning system described could be used as an adjunct to other positioning systems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mobile object configured for movement in an area equipped with at least first and second illumination sources, each of the first and second illumination sources configured to emit illumination from which a unique identifier of the first or second illumination source can be determined, the first and second illumination sources being disposed separate from the mobile object in the area, the mobile object comprising:
   a light sensor arranged to detect illumination from at least one of the first or second illumination sources within the view of the light sensor;
   a computer arranged to determine from the detected illumination (i) a position of the mobile object relative to the at least one of the first or second illumination source and (ii) the identifier of the at least one of the first or second illumination source; and a transceiver coupled to the computer and configured to receive from at least one other mobile object in the area a message comprising the position of the at least one other mobile object relative to the at least one of the first or second illumination sources, and the identifier of that at least first or second illumination source, the computer configured to determine from its position and the message received from the at least one other mobile object a distance from the at least one other mobile object;

wherein the computer is arranged to determine the position of the mobile object relative to the at least one of the first or second illumination source through use of at least a predetermined vertical distance between the light sensor and the first or second illumination source, the computer is configured to determine an intended path of the mobile object and to transmit the intended path to a path management entity, and the intended path includes at least a defined timing of travel when the mobile object will be at specific locations.

2. A mobile object according to claim 1, wherein the transceiver is configured to transmit a message comprising (i) the position of the mobile object relative to the at least one of the first or second illumination source determined by the computer and (ii) the identifier of the at least one of the first or second illumination source.

3. A mobile object according to claim 1, wherein the transmitted or received message comprises a footprint of the mobile object.

4. The mobile object according to claim 3, wherein the footprint comprises at least one of a surface area or a volume of the mobile object.

5. The mobile object according to claim 3, wherein the footprint comprises a contour of the mobile object.

6. A mobile object according to claim 1, wherein the transmitted or received message comprises the speed of the mobile object.

7. A mobile object according to claim 1, wherein the light sensor is arranged to detect illumination from the first and second illumination sources in the area, and the computer is arranged to determine from the detected illumination an orientation of the mobile object relative to the first and second illumination sources.

8. A mobile object according to claim 1, wherein the computer is arranged to determine a distance of the mobile object with respect to the at least one of the first or second illumination source.

9. A mobile object according to claim 1 comprising an image recognition module configured to access image data captured by the light sensor for use in determining the position of the mobile object.

10. A mobile object according to claim 1 comprising a memory for recording movement of the mobile object in the area.

11. A positioning system comprising:
at least one mobile object according to claim 1;
the first and second illumination sources, each configured to emit illumination from which a unique identifier of the respective illumination source can be determined; and
at least one other mobile object.

12. A positioning system according to claim 11, wherein said positioning system is arranged indoor as part of a building lighting infrastructure.

13. A positioning system according to claim 11, wherein said positioning system is arranged outdoor as part of a lighting infrastructure.

14. The mobile object according to claim 1, wherein the first and second illumination sources are located separately from the mobile object and the at least one other mobile object.

15. The mobile object according to claim 1, wherein the light sensor is arranged to detect illumination from both of the first and second illumination sources; the computer is arranged to determine from the detected illumination the position of the mobile object relative to both of the first and second illumination source; and the transceiver is configured to receive from at least one other mobile object in the area a message comprising the position of the at least one other mobile object relative to both of the first and second illumination sources.

16. A mobile object configured for movement in an area equipped with at least first and second illumination sources, each of the first and second illumination sources configured to emit illumination from which a unique identifier of the first or second illumination source can be determined, the first and second illumination sources being disposed separate from the mobile object in the area, the mobile object comprising:

a light sensor arranged to detect illumination from at least one of the first or second illumination sources within the view of the light sensor;

a computer arranged to determine from the detected illumination (i) a position of the mobile object relative to the at least one of the first or second illumination source and (ii) the identifier of the at least one of the first or second illumination source; and a transceiver coupled to the computer and configured to transmit a message to at least one other mobile object in the area, the message comprising (i) the position of the mobile object relative to the at least one of the first or second illumination source determined by the computer and (ii) the identifier of the at least one of the first or second illumination source, whereby the at least one other mobile object can determine a distance between the mobile object and itself based on its own position relative to the at least one of the first or second illumination source, and the position in the message;

wherein the computer is arranged to determine the position of the mobile object relative to the at least one of the first or second illumination source through use of at least a predetermined vertical distance between the light sensor and the first or second illumination source, the computer is configured to determine an intended path of the mobile object and to transmit the intended path to a path management entity, and the intended path includes at least a defined timing of travel when the mobile object will be at specific locations.

17. A method implemented at a mobile object of determining distance between the mobile object and at least one other mobile object moving in an area equipped with at least first and second illumination sources, each of the first and second illumination sources configured to emit illumination from which a unique identifier of the first or second illumination source can be determined, the first and second illumination sources being disposed separate from the mobile object in the area, the method comprising:

detecting by a light sensor illumination from at least one of the first or second illumination sources;

determining from the detected illumination (i) a position of the mobile object relative to the at least one of the first or second illumination source through use of at least a predetermined vertical distance between the light sensor and the first or second illumination source and (ii) the identifier of the at least one of the first or second illumination source;

determining an intended path of the mobile object, the intended path including at least a defined timing of travel when the mobile object will be at specific locations, and transmitting the intended path to a path management entity;

receiving from the at least one other mobile object a message comprising the position of the at least one other mobile object relative to the at least one of the first or second illumination source; and determining from the position of the mobile object and the at least one other mobile object a distance between them.

18. A processor configured to:

download a computer program product from a communications network and/or access the computer program product stored on a computer readable medium and/or microprocessor-executable medium, wherein the computer program product comprises computer program code instructions; and execute the computer program code instructions to implement a method as claimed in the method claim 17.

\* \* \* \* \*